(12) United States Patent
Wu (10) Patent No.: US 11,370,635 B2
(45) Date of Patent: Jun. 28, 2022

(54) SINGLE BOX TYPE ELECTRIC WIRE PUSHING AND PULLING MACHINE

(71) Applicant: SHIU CHUAN FA ENTERPRISE CO., LTD., Kaohsiung (TW)

(72) Inventor: Yi-Hsiang Wu, Kaohsiung (TW)

(73) Assignee: Shiu Chuan Fa Enterprise Co., Ltd., Kaohsiung (TW)

( * ) Notice: Subject to any disclaimer, the term of this patent is extended or adjusted under 35 U.S.C. 154(b) by 704 days.

(21) Appl. No.: 16/415,212

(22) Filed: May 17, 2019

(65) Prior Publication Data
US 2020/0361742 A1 Nov. 19, 2020

(51) Int. Cl.
  *B65H 51/10* (2006.01)
  *B65H 51/32* (2006.01)
  *H02G 1/08* (2006.01)

(52) U.S. Cl.
  CPC ............. *B65H 51/10* (2013.01); *B65H 51/32* (2013.01); *H02G 1/083* (2013.01); *B65H 2701/376* (2013.01)

(58) Field of Classification Search
  CPC ......... B65H 51/10; B65H 51/32; H02G 1/083
  See application file for complete search history.

(56) References Cited

U.S. PATENT DOCUMENTS 6,073,916 A * 6/2000 Plummer ............... B65H 51/10
254/134.3 R

FOREIGN PATENT DOCUMENTS

CN 204802742 U 11/2015

OTHER PUBLICATIONS

Machine Translation of CN 204802742 U, Nov. 25, 2015. (Year: 2015).*

* cited by examiner

*Primary Examiner* — William E Dondero
(74) *Attorney, Agent, or Firm* — Rosenberg, Klein & Lee (57) ABSTRACT

A single box type electric wire pushing and pulling machine is disclosed herein. It comprises a U-shaped shell having a first panel and a second panel, and an assembling socket accommodated in the U-shaped shell and having a first holder, a second holder, an adjusting rod disposed between the first holder and the second holder for adjusting the spacing, two extension parts respectively extended from an upper end and a lower end of the second holder, a gear axle hole defined by front ends of the two extension parts, two long troughs respectively disposed at a front end and a rear end of the second holder and two limit members correspondingly assembled to the two long troughs for respectively connecting with the first panel and the second panel of the U-shaped shell.

9 Claims, 9 Drawing Sheets

SINGLE BOX TYPE ELECTRIC WIRE PUSHING AND PULLING MACHINE

BACKGROUND OF THE INVENTION

1. Field of the Invention

The present invention relates to a single box type electric wire pushing and pulling machine which has an aesthetic appearance, a reduced overall volume, a light weight and prevents the internal lubricating oil from overflowing the U-shaped shell so that the smoothness and speed of the wire pushing and pulling operation can be improved, and the situation that the wire is twisted and wound inside the U-shaped shell can be avoided to increase the efficiency of pushing and pulling the wire.

2. Description of Related Art

The conventional electric wire drawing machine, for instance, the China patent CN204802742U, issued on 25 Nov. 2015, has disclosed a hand-held electric wire drawing device having two worm wheels. It comprises a worm wheel rod, two opening box bodies opposite to each other and combined to form a box assembly for connecting the worm wheel rod by openings thereof, plural worm wheels of the same size arranged in a row at each of the two sides of the worm wheel rod for connecting the worm wheel rod and to form a worm wheel assembly; plural towing wire pressure wheels of the same size arranged in a row for correspondingly assembling on the plural worm wheels and to form a towing wire pressure wheel assembly, and plural rotating shafts. Each of the plural rotating shafts connects one worm wheel and one plural towing wire pressure wheel disposed on the one worm wheel, so that the worm wheel shares one rotating shaft with the towing wire pressure wheel on the worm wheel. Furthermore, an upper panel and a lower panel of each of the two opening box bodies are provided with plural shaft holes for respectively connecting two ends of the plural rotating shafts. A side panel at a lower portion of each of the two opening box bodies is formed with a projecting plate, and the two projecting plates form a continuous structure of the two opening box bodies and correspondingly form an overlapping structure. The worm wheel rod passes through the overlapping structure formed by the two projecting plates of the two opening box bodies to form a rotating connection structure. A bottom plate of each of the two opening box bodies is provided with plural lock holes, and plural screw rods are correspondingly inserted into the plural lock holes so as to fix the spacing between the two bottom plates of the two opening box bodies. The two worm wheels are respectively and correspondingly disposed in the two opening box bodies and arranged on the two sides of the worm wheel rod so as to engage with the worm wheel rod by the plural worm wheels. The two towing wire pressure wheel assemblies are respectively and correspondingly disposed in the two opening box bodies and arranged in the same plane, and the lateral sides of the plural towing wire pressure wheels in one towing wire pressure wheel assembly contact the lateral sides of the plural towing wire pressure wheels in the other towing wire pressure wheel assembly. In other words, the lateral sides of the plural towing wire pressure wheels in one opening box body are in contact with the lateral sides of the plural towing wire pressure wheels in the other opening box body.

Although the abovementioned conventional electric wire drawing machine achieves the intended effects of drawing the wire into the distribution pipeline, it still has disadvantages in a practical use that need to be improved as following:

1. The conventional electric wire drawing machine comprises two opening box bodies combined into one box, resulting in poor appearance, large volume, increased structural weight, environmental pollution due to easily leakage of the internal lubricating oil and inconvenient use.

2. The conventional electric wire drawing machine comprising two opening box bodies combined into one box has poor overall structural stability and causes an increased spacing between the box assembly and the towing wire pressure wheel assembly, so the traction wire is easily twisted and wound between the box assembly and the towing wire pressure wheel assembly during the wire traction procedure, resulting in the need to interrupt the job to rearrange the traction wire.

SUMMARY OF THE INVENTION

In view of the above-mentioned problems, the object of the present invention is to provide a single box type electric wire pushing and pulling machine which has an aesthetic appearance, a reduced overall volume, a light weight and prevents the internal lubricating oil from overflowing the U-shaped shell so that the smoothness and speed of the wire pushing and pulling operation can be improved, and the situation that the wire is twisted and wound inside the U-shaped shell can be avoided to increase the efficiency of pushing and pulling the wire.

DETAILED DESCRIPTION OF THE PREFERRED EMBODIMENT

Hereinafter, an exemplary embodiment of the present invention will be described in detail with reference to the accompanying drawings.

As showed in FIG. 1 to FIG. 5, a first embodiment for a single box type electric wire pushing and pulling machine according to the present invention is disclosed herein. The single box type electric wire pushing and pulling machine comprises a U-shaped shell (1), an assembling socket (2), four guide wheel assemblies (3) and a gear axle (4).

The U-shaped shell (1) has a partition (11) to partition the U-shaped shell (1) into a lower chamber (12) and an upper chamber (13), a first panel (14) at a first end thereof and a second panel (15) at a second end thereof. The first panel (14) is provided with a perforation (141) corresponding to the lower chamber (12) and a via hole (142) and corresponding to the upper chamber (13). The second panel (15) is provided with an installation hole (151) corresponding to the upper chamber (13) and a guidance pipe (152) disposed in the installation hole (151).

The assembling socket (2) is assembled in the lower chamber (12) of the U-shaped shell (1) and provided with a first holder (21), a second holder (22) and an adjusting rod (23). The first holder (21) has a first adjusting hole (211) at an upper end thereof, and the second holder (22) has a second adjusting hole (221) at an upper end thereof. The adjusting rod (23) is inserted into the first adjusting hole (211) and the second adjusting hole (221) and protruded from the U-shaped shell (1) by one end thereof. The adjusting rod (23) is further provided with an adjusting component (231) at an outside of the U-shaped shell (1) and sleeved with a supporting elastic element (232) at a position between the first adjusting hole (211) and the second adjusting hole (221) so that two ends of the supporting elastic element (232) respectively lean against the first adjusting hole (211) and the second adjusting hole (221). The first holder (21) further has a first slot (212) therein, two first shaft holes (213) at the upper end and a lower end thereof for communicating the first slot (212), plural locating holes (214) at a front end and a rear end thereof and plural positioning members (215) correspondingly assembled to the plural locating holes (214) for securing the first panel (14) and the second panel (15) of the U-shaped shell (1) to the first holder (21). The second holder (22) further has a second slot (222), two second shaft holes (223) at the upper end and a lower end thereof for communicating the second slot (222), two extension parts (224) respectively extended from the upper end and the lower end thereof, a gear axle hole (225) defined by front ends of the two extension parts (224), two long troughs (226) respectively disposed at a front end and a rear end thereof and two limit members (227) correspondingly assembled to the two long troughs (226) for respectively positioning the first panel (14) and the second panel (15) of the U-shaped shell (1) on the second holder (22).

Each of the four guide wheel assemblies (3) has a shaft rod (31), a gear wheel (32) and a guide wheel (33). The shaft rod (31) of each of the four guide wheel assemblies (3) is for assembling in each of the two first shaft holes (213) of the first holder (21) or for assembling in each of the two second shaft holes (223) of the second holder (22) of the assembling socket (2). Furthermore, the shaft rod (31) of each of the four guide wheel assemblies (3) is sleeved with a bearing (311) at a position between each of the two first shaft holes (213) and each of the two second shaft holes (223). The gear wheel (32) of each of the four guide wheel assemblies (3) is inserted into the first slot (212) of the first holder (21) or the second slot (222) of the second holder (22). The guide wheel (33) of each of the four guide wheel assemblies (3) is inserted into the upper end of the first holder (21) or the upper end of the second holder (22) and accommodated in the upper chamber (13) of the U-shaped shell (1). Furthermore, an outer surface of the guide wheel (33) of each of the four guide wheel assemblies (3) is integrally injected and packaged with a first guiding groove (331) and a second guiding groove (332) having a different width from the first guiding groove (331).

The gear axle (4) is inserted into the two extension parts (224) of the second holder (22) of the assembling socket (2) for engaging with the gear wheel (32) of each of the four guide wheel assemblies (3). A front end of the gear axle (4) is protruded from the gear axle hole (225) and a rear end of the gear axle (4) is inserted into the perforation (141) of the first panel (14). Furthermore, the gear axle (4) is sleeved with two gear bearings (41), one of which is located between the front end of the gear axle (4) and the gear axle hole (225) and the other one is located between the rear end of the gear axle (4) and the perforation (141).

Figure 1:
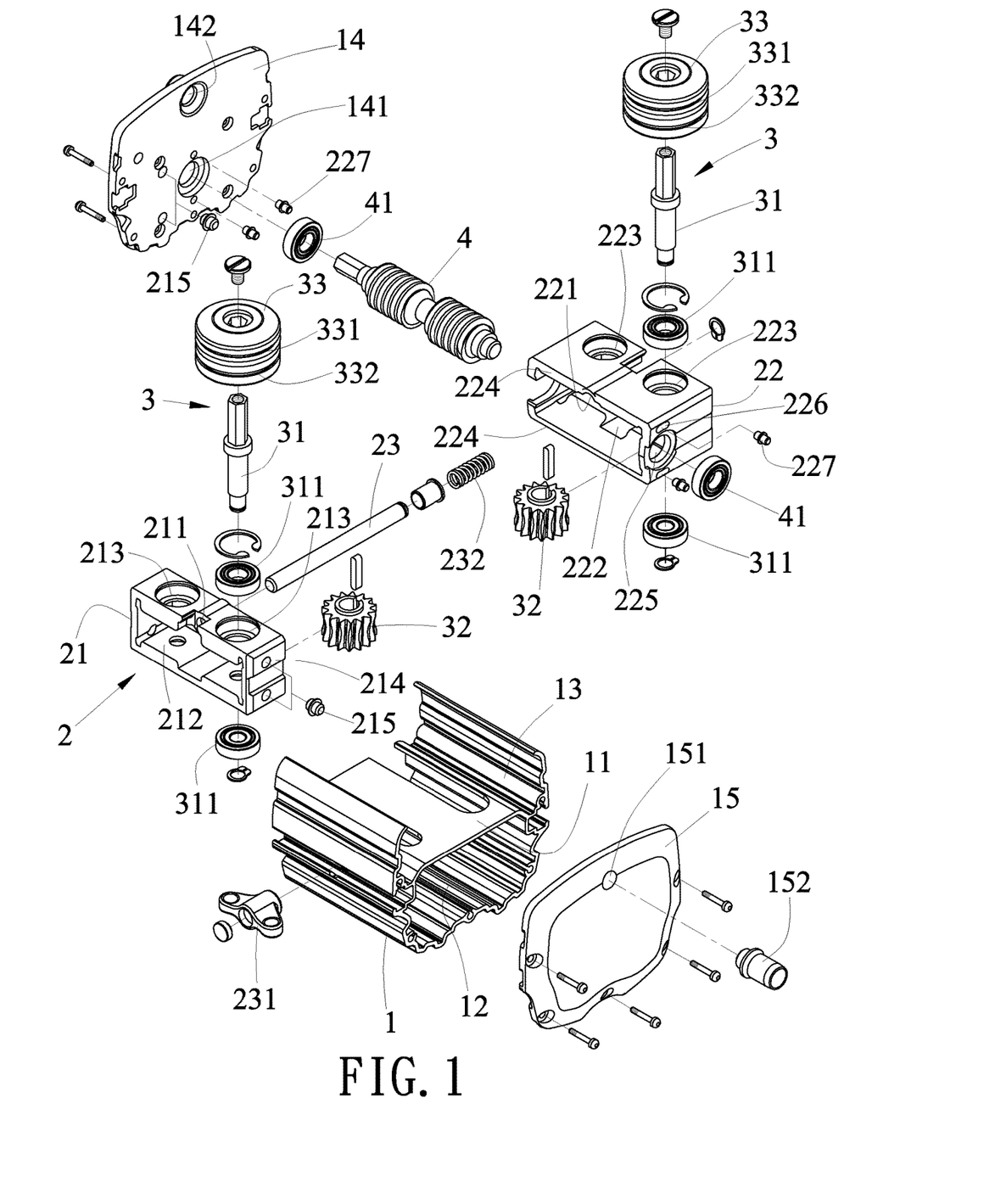
FIG. 1 is an exploded view showing a first embodiment for a single box type electric wire pushing and pulling machine according to the present invention.
Figure 2:
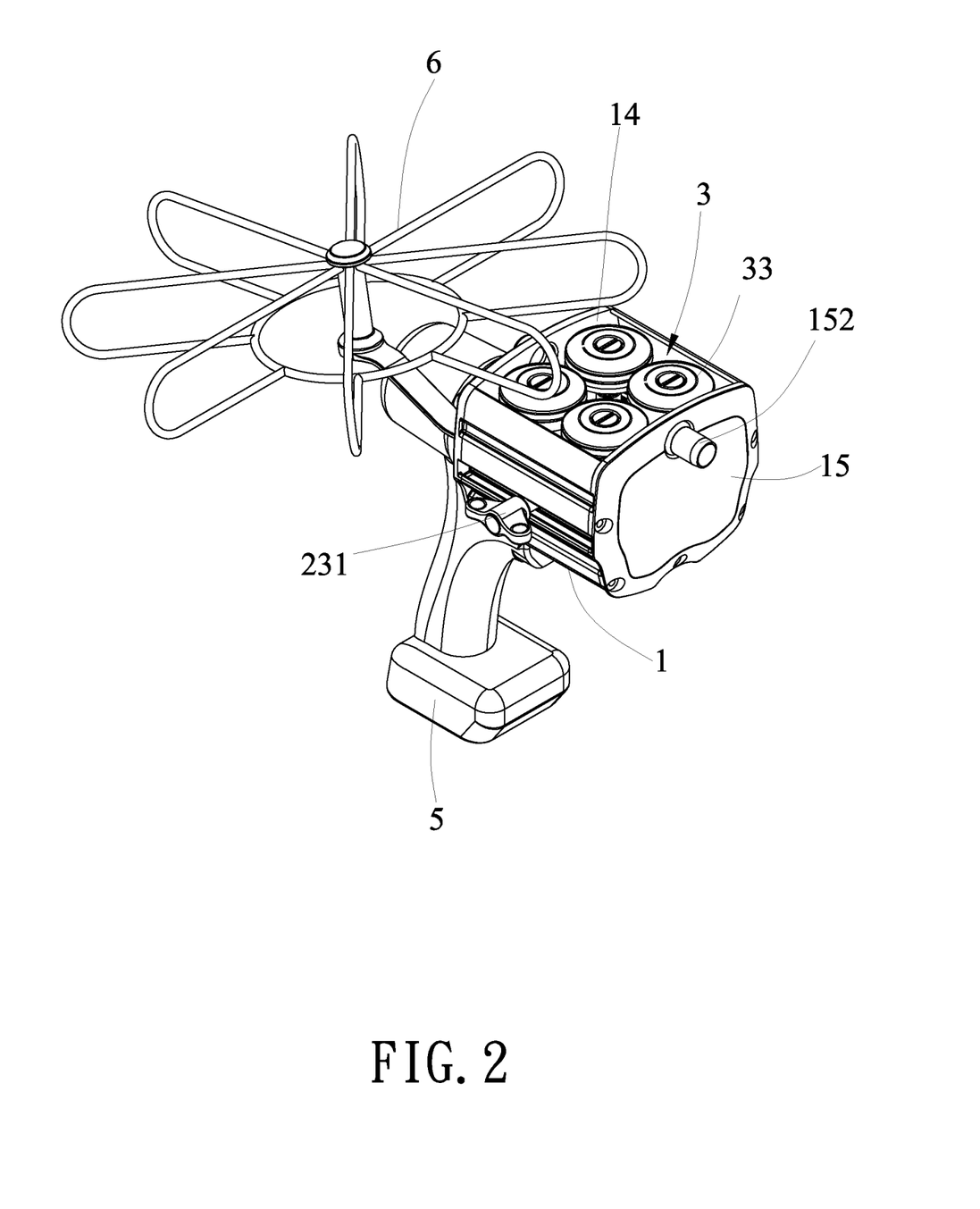
FIG. 2 is a stereogram showing the first embodiment for the single box type electric wire pushing and pulling machine in assembly according to the present invention.
Figure 3:
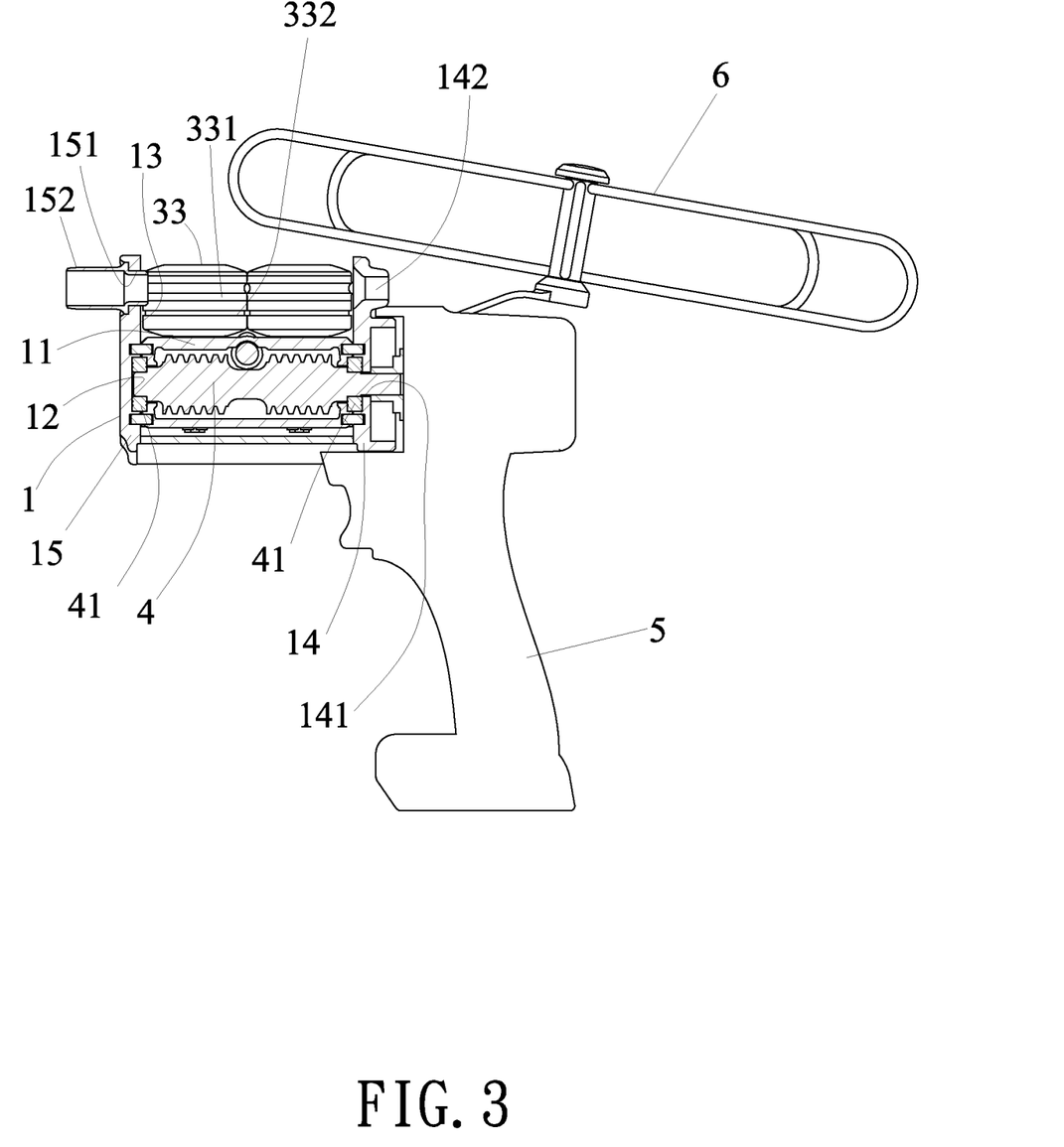
FIG. 3 is a lateral view showing a single box type electric wire pushing and pulling machine in assembly according to the present invention.
Figure 4:
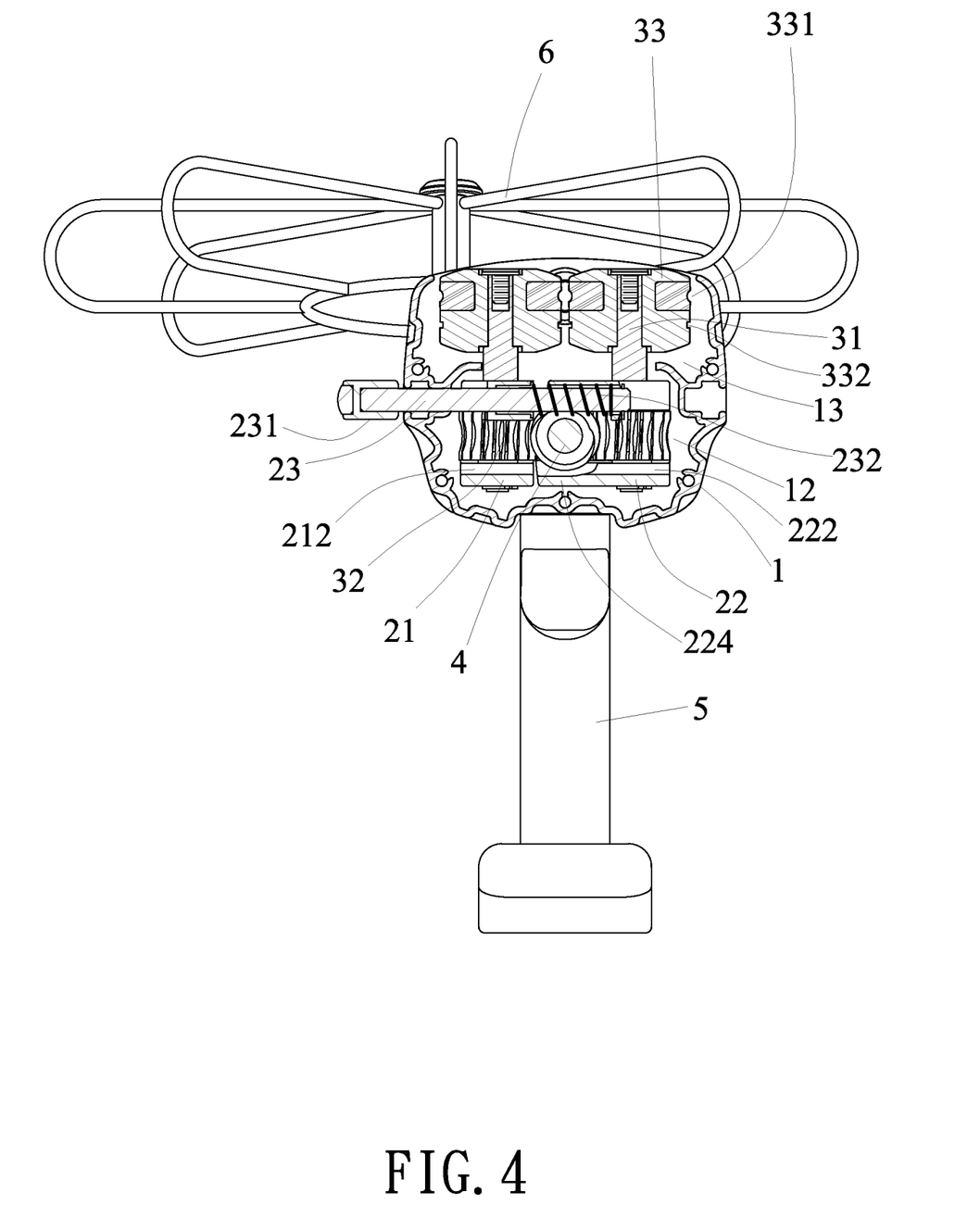
FIG. 4 is a first cross-sectional view showing a single box type electric wire pushing and pulling machine according to the present invention.
Figure 5:
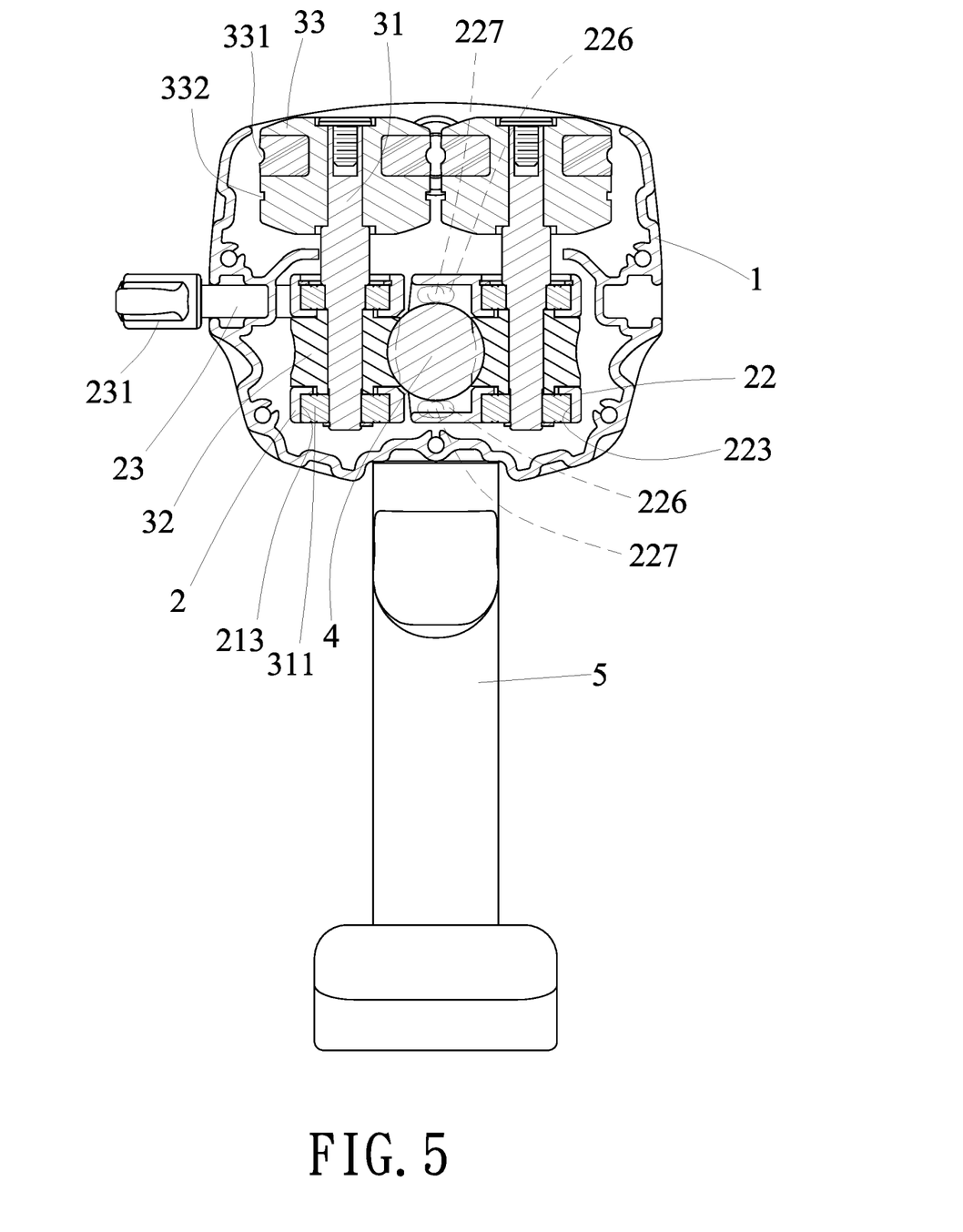
FIG. 5 is a second cross-sectional view showing a single box type electric wire pushing and pulling machine according to the present invention.
Figure 6:
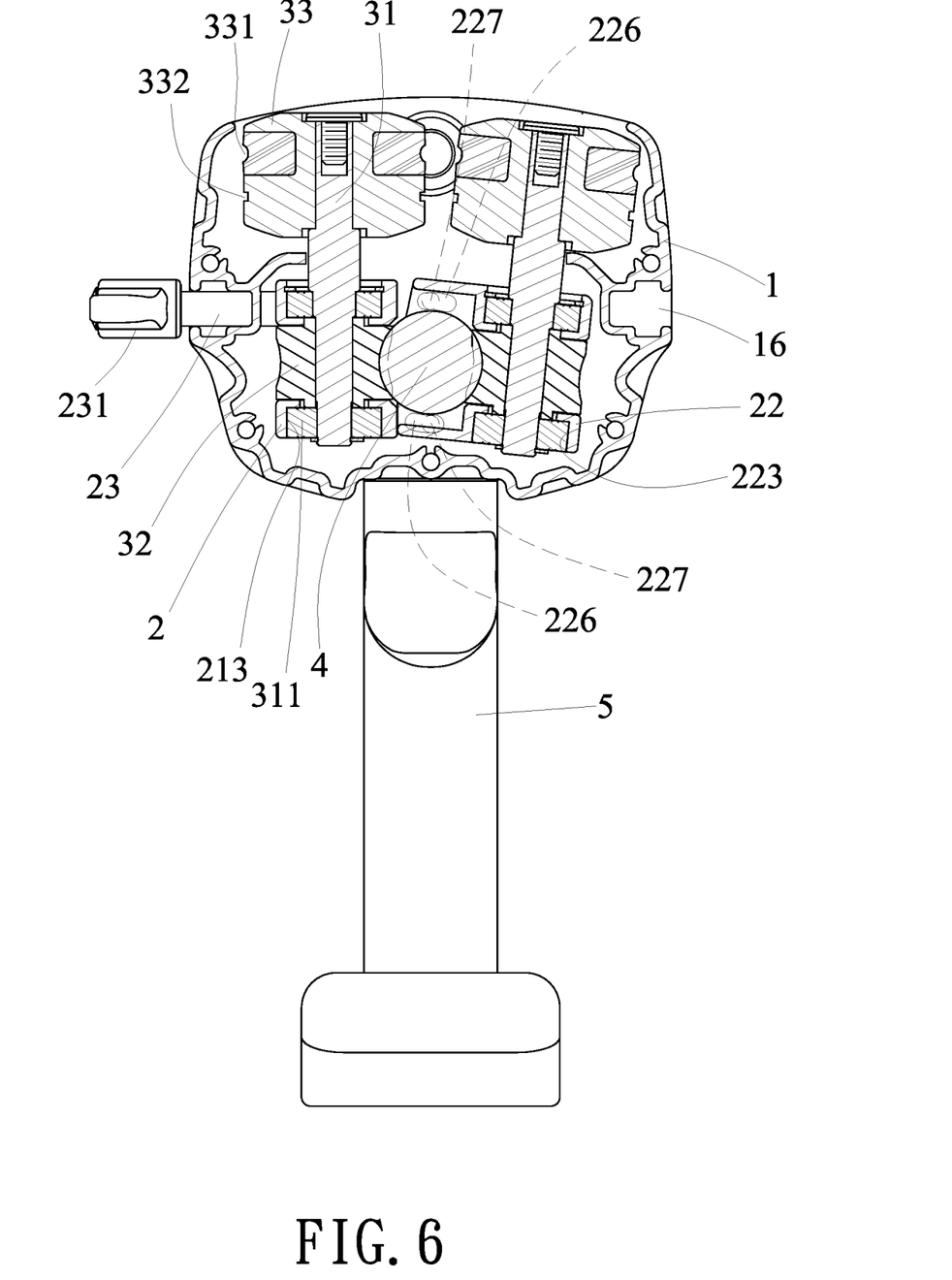
FIG. 6 is a schematic diagram showing an assembling socket in an adjusted state according to the present invention.

When the U-shaped shell (1) is assembled to an electric rotating tool (5), the rear end of the gear axle (4) is inserted in to the perforation (141) of the first panel (14) of the U-shaped shell (1) for connecting an output end of the electric rotating tool (5). Additionally, the U-shaped shell (1) is connected with a pull wire collecting wheel (6) so that a wire wound by the pull wire collecting wheel (6) is drawn to insert into the via hole (142) of the first panel (14) of the U-shaped shell (1), pass through the guide wheel (33) of each of the four guide wheel assemblies (3) and protrude from the guidance pipe (152) disposed in the installation hole (151) of the second panel (15). The first guiding groove (331) and the second guiding groove (332) having a different width from the first guiding groove (331) are integrally injected on the outer surface of the guide wheel (33) of each of the four guide wheel assemblies (3), so the guide wheel (33) can also be assembled onto the shaft rod (31) in an upside down orientation according to the different diameters and materials of the drawing wire, e.g. plastic drawing wire, metal drawing wire and the like. In this way, the wire passing through the guide wheels (33) of the four guide wheel assemblies (3) is guided by the first guiding groove (331) and the second guiding groove (332) to keep on a parallel axis. The adjusting component (231) of the adjusting rod (23) is used to adjust the spacing between the first holder (21) and the second holder (22) of the assembling socket (2) so as to apply to the wires of different diameters. Referring to FIG. 6, the adjusted movement of the second holder (22) is limited by the range of movement of the two limit members (227) in the two long troughs (226) to prevent the second holder (22) from colliding with the U-shaped shell (1), and thus the stability of the overall structure can be increased.

Accordingly, the present invention can be used to drive the gear axle (4) to rotate with the electric rotating tool (5), so that the gear wheels (32) of the four guide wheel assemblies (3) engage with the gear axle (4) to rotate together. When the gear wheels (32) are rotated, the shaft rods (31) also drive the guide wheels (33) to rotate, and the guide wheels (33) guide the drawing wire to move to conduct the wire drawing procedure.

Figure 7:
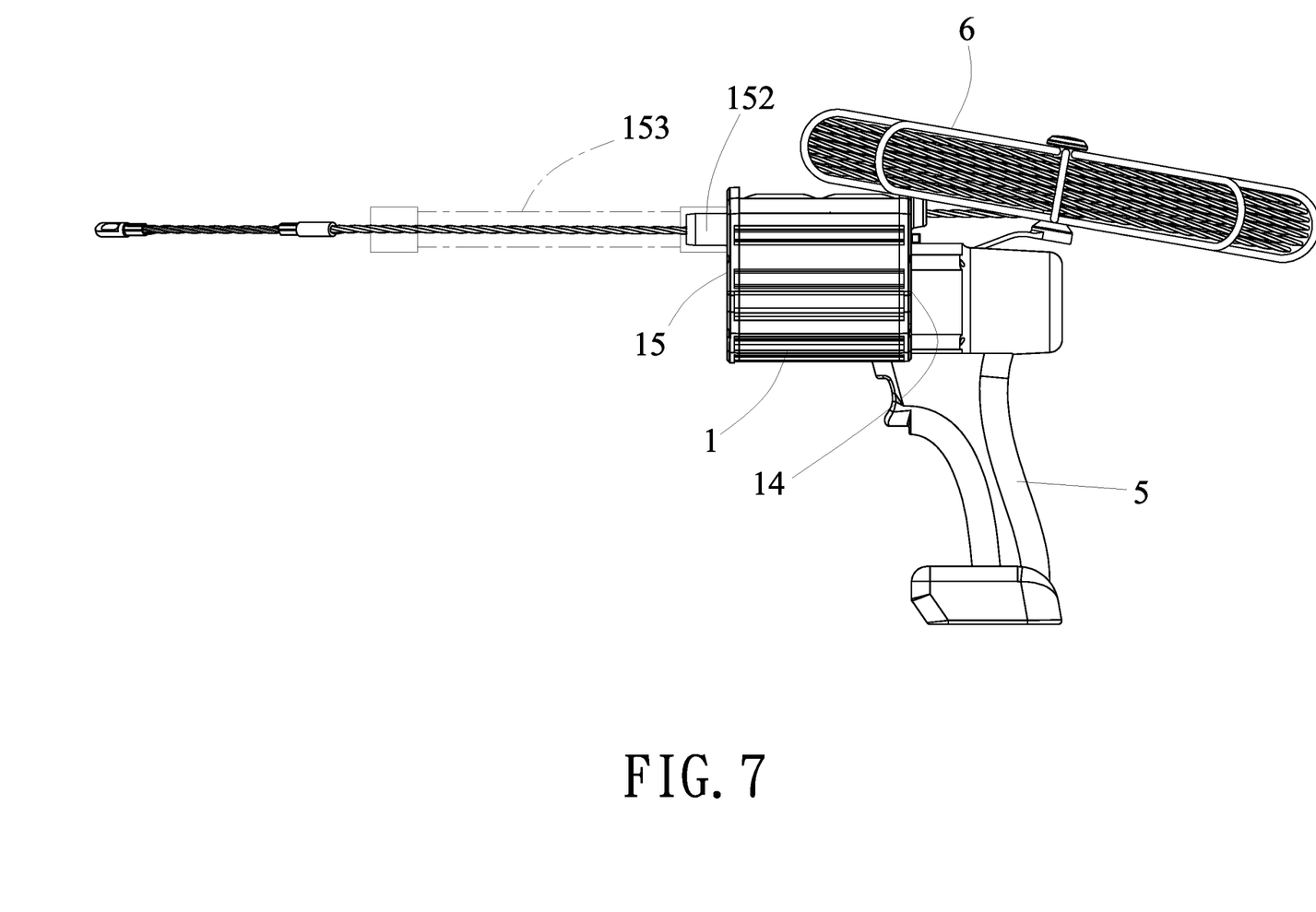
FIG. 7 is a stereogram showing a second embodiment for a single box type electric wire pushing and pulling machine according to the present invention.
Figure 8:
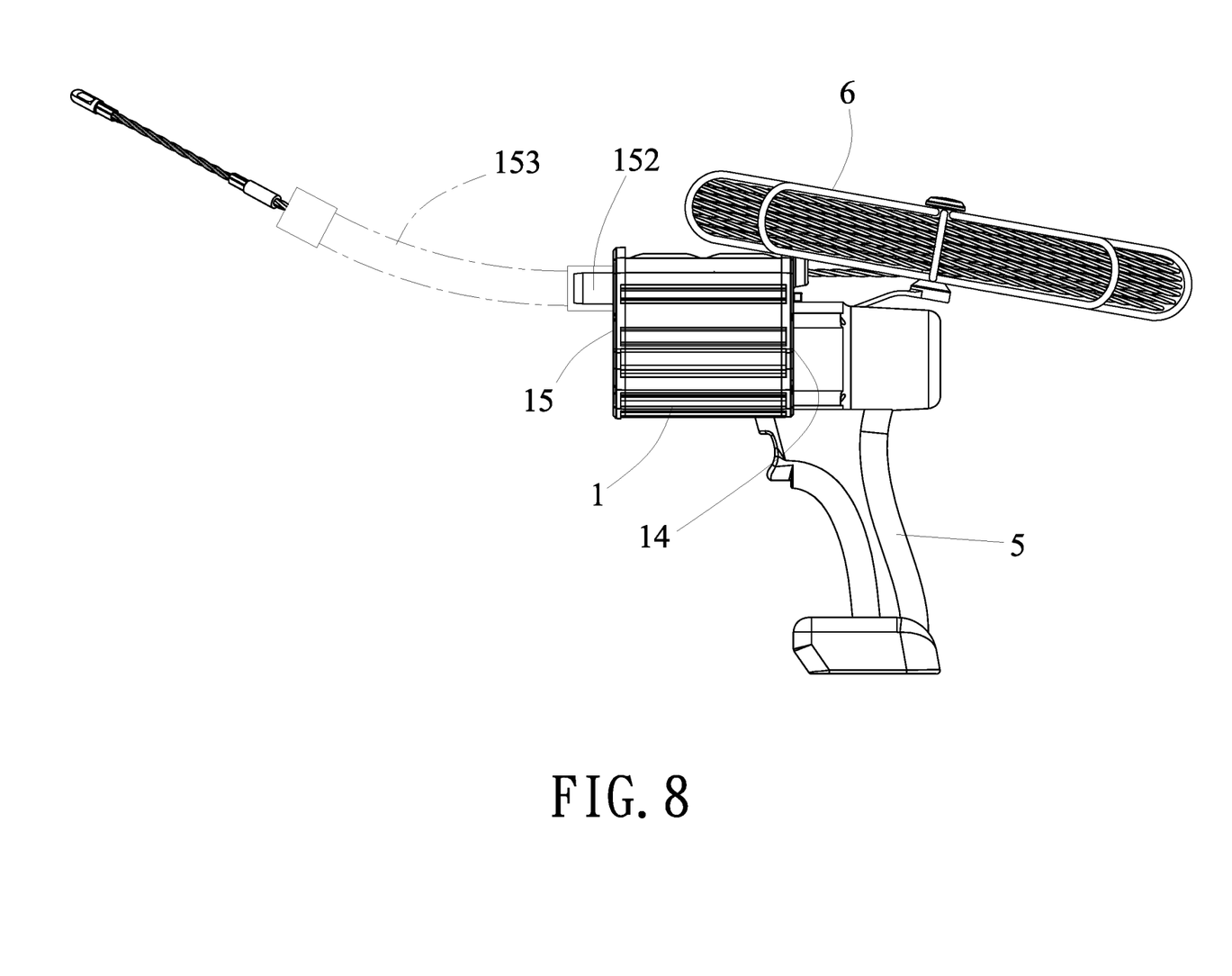
FIG. 8 is a schematic diagram showing the second embodiment for the single box type electric wire pushing and pulling machine in use according to the present invention.

Referring to FIG. 7, a second embodiment for a single box type electric wire pushing and pulling machine according to the present invention is disclosed. The guidance pipe (152) disposed in the installation hole (151) of the second panel (15) of the U-shaped shell (1) is provided for fast connecting a flexible pipe (153). As shown in FIG. 8, the flexible pipe (153) is convenient for bending and extension at different angles, so that it can be more suitable for different pipelines during the wire pushing and pulling operation, and the convenience of the wire pushing and pulling process is further increased.

Figure 9:
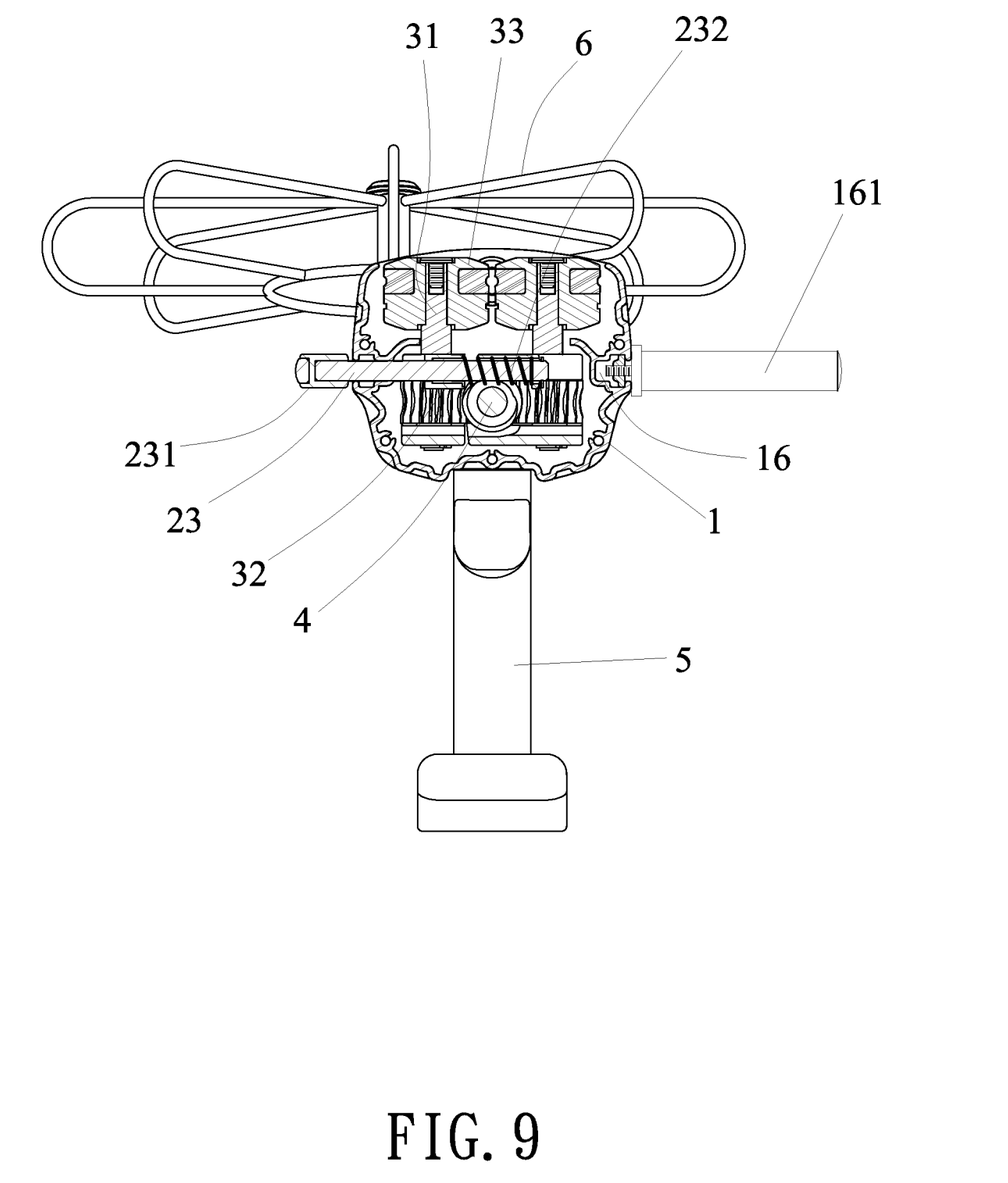
FIG. 9 is a cross-sectional view showing a third embodiment for a single box type electric wire pushing and pulling machine according to the present invention.

Referring to FIG. 9, a third embodiment for a single box type electric wire pushing and pulling machine according to the present invention is disclosed. The U-shaped shell (1) is provided with a connecting slot (16) at an outside thereof, and a handle (161) is correspondingly inserting into the connecting slot (16), which is convenient for a user to hold the electric rotating tool (5) by one hand and hold the handle (161) by the other hand to perform the wire pushing and pulling operation.

According to the above description, in comparison with the traditional technique, the single box type electric wire pushing and pulling machine according to the present invention has the advantages as following:

1. The present invention uses a single box for accommodating the assembling socket, the guide wheel assemblies and the gear axle, which has an aesthetic appearance, a reduced overall volume, a light weight and prevents the internal lubricating oil from overflowing the U-shaped shell and increases the wire drawing efficiency.

2. The single U-shaped shell of the present invention can reduce the distance from the guide wheel assemblies, which makes the wire pushing and pulling operation work smoothly and prevents the drawing wire from twisting and winding inside the U-shaped shell.

3. The first guiding grooves and the second guiding grooves formed on the outer surfaces of the guide wheels allow the guide wheels to be assembled upside down onto the shaft rods based on the different diameters and materials of the drawing wire to keep the wire passing through the guide wheels on a parallel axis, so the pushing and pulling operation is more stable and fast, and the efficiency of pushing and pulling is improved.

What is claimed is:

1. A single box type electric wire pushing and pulling machine, comprising:
    a U-shaped shell having a first panel at a first end thereof and a second panel at a second end thereof, wherein the first panel is provided with a perforation and a via hole and the second panel is provided with an installation hole and a guidance pipe disposed in the installation hole;
    an assembling socket assembled in the U-shaped shell and provided with a first holder having a first adjusting hole at an upper end thereof, a second holder having a second adjusting hole at an upper end thereof, and an adjusting rod penetrating the first adjusting hole and the second adjusting hole and protruded from the U-shaped shell by one end thereof, wherein the first holder further has a first slot, two first shaft holes at the upper end and a lower end thereof for communicating the first slot, plural locating holes at a front end and a rear end thereof and plural positioning members correspondingly assembled to the plural locating holes for securing the first panel and the second panel of the U-shaped shell to the first holder, and wherein the second holder further has a second slot, two second shaft holes at the upper end and a lower end thereof for communicating the second slot, two extension parts respectively extended from the upper end and the lower end thereof, a gear axle hole defined by front ends of the two extension parts, two long troughs respectively disposed at a front end and a rear end thereof and two limit members correspondingly assembled to the two long troughs for respectively positioning the first panel and the second panel of the U-shaped shell on the second holder;
    four guide wheel assemblies and each of which has a shaft rod for assembling in each of the two first shaft holes of the first holder or for assembling in each of the two second shaft holes of the second holder of the assembling socket, a gear wheel inserted into the first slot of the first holder or the second slot of the second holder, and a guide wheel inserted into the upper end of the first holder or the upper end of the second holder, wherein an outer surface of the guide wheel is formed with a first guiding groove and a second guiding groove having a different width from the first guiding groove; and
    a gear axle inserted into the two extension parts of the second holder of the assembling socket for engaging with the gear wheel of each of the four guide wheel assemblies and having a front end protruded from the gear axle hole and a rear end inserted into the perforation of the first panel.

2. The single box type electric wire pushing and pulling machine as claimed in claim 1, wherein the U-shaped shell is provided with a partition to partition the U-shaped shell into a lower chamber for accommodating the assembling socket and communicating with the perforation and an upper chamber for accommodating the four guide wheel assemblies and communicating with the via hole and the installation hole.

3. The single box type electric wire pushing and pulling machine as claimed in claim 1, wherein the adjusting rod of the assembling socket is provided with an adjusting component at the one end protruded from the U-shaped shell.

4. The single box type electric wire pushing and pulling machine as claimed in claim 1, wherein the adjusting rod between the first adjusting hole and the second adjusting hole is provided with a supporting elastic element, and wherein two ends of the supporting elastic element respectively lean against the first adjusting hole and the second adjusting hole.

5. The single box type electric wire pushing and pulling machine as claimed in claim 1, wherein the shaft rod of each of the four guide wheel assemblies is sleeved with a bearings for connecting the first shaft hole or the second shaft hole.

6. The single box type electric wire pushing and pulling machine as claimed in claim 1, wherein the first guiding groove and the second guiding groove having a different width from the first guiding groove are integrally injected on the outer surface of the guide wheel of each of the four guide wheel assemblies, and wherein the guide wheel is assembled upside down onto the shaft rod to keep a wire passing through the guide wheels of the four guide wheel assemblies on a parallel axis.

7. The single box type electric wire pushing and pulling machine as claimed in claim 1, wherein the gear axle is sleeved with two gear bearings respectively located between the front end thereof and the gear axle hole and between the rear end thereof and the perforation.

8. The single box type electric wire pushing and pulling machine as claimed in claim 1, wherein the guidance pipe disposed in the installation hole of the second panel of the U-shaped shell is provided for connection to a flexible pipe.

9. The single box type electric wire pushing and pulling to machine as claimed in claim 1, wherein the U-shaped shell is provided with a connecting slot at an outside thereof for insertion of a handle.

* * * * *